(No Model.) 2 Sheets—Sheet 1.
W. M. WHITE.
HAY LOADER.
No. 398,682. Patented Feb. 26, 1889.
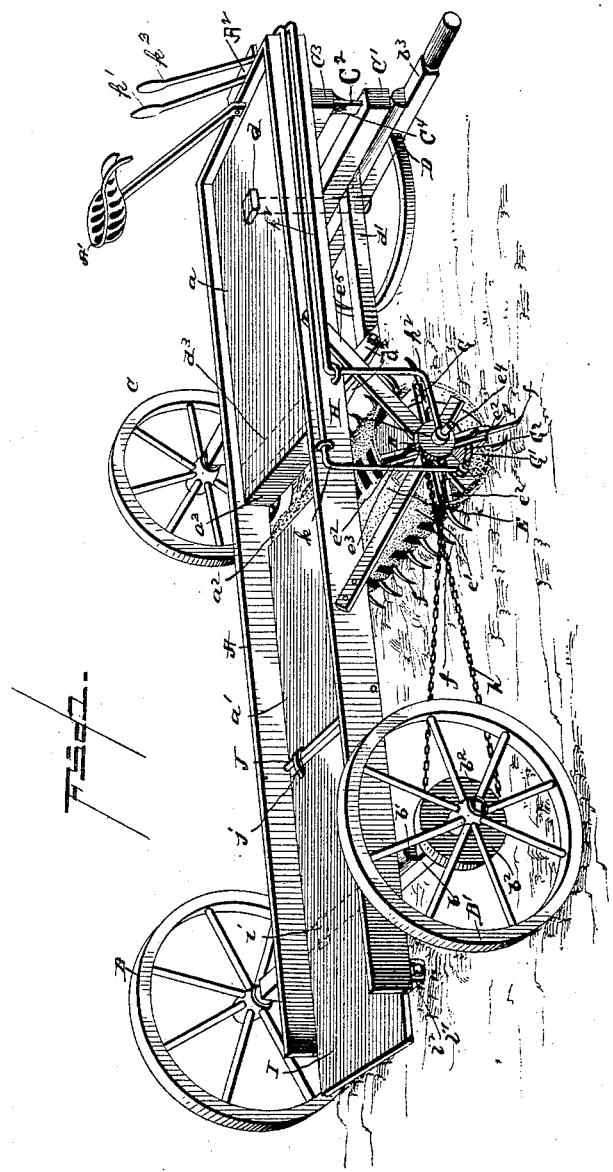
WITNESSES
INVENTOR,
William M. White.
Attorney.

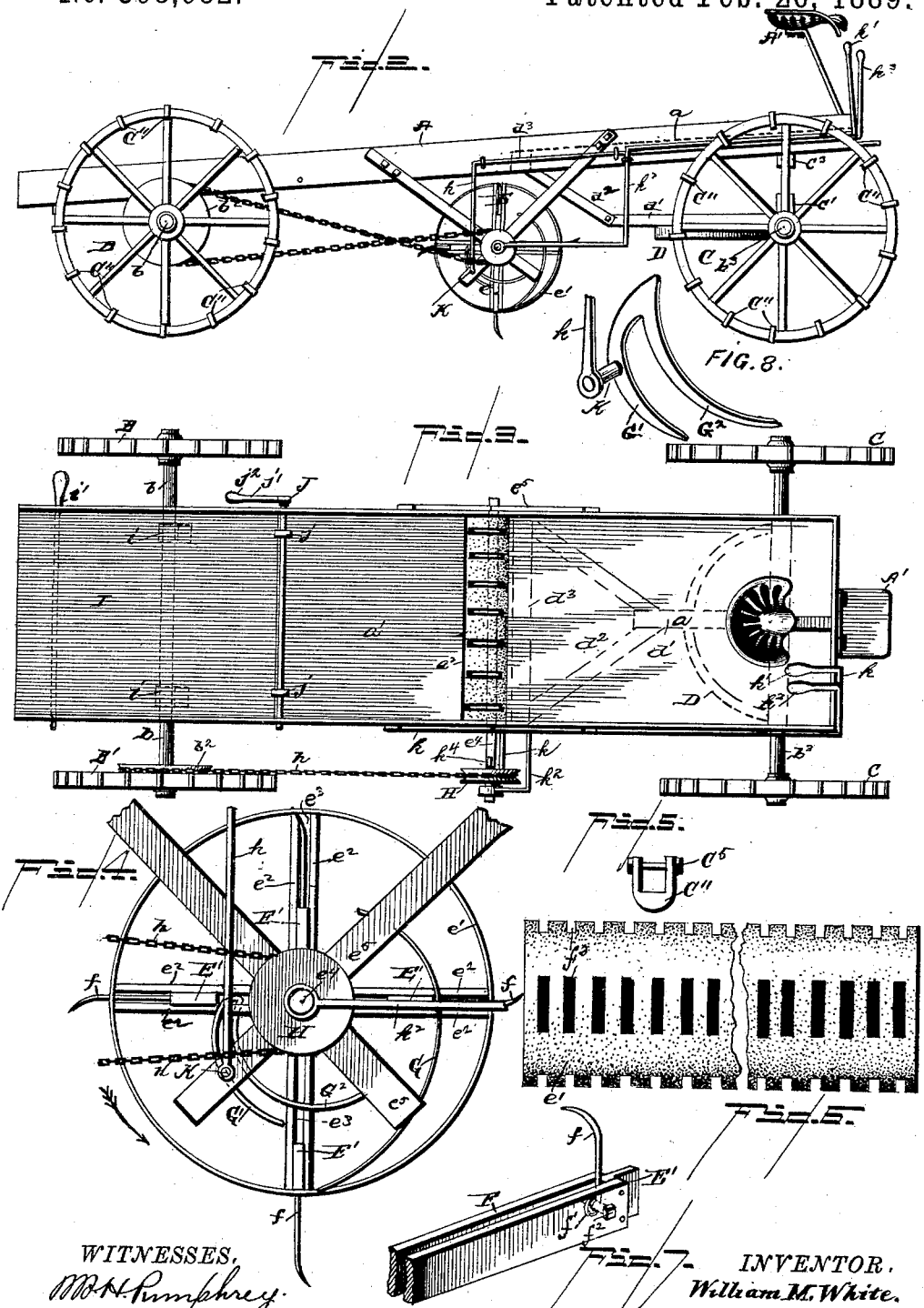

UNITED STATES PATENT OFFICE.

WILLIAM M. WHITE, OF TACOMA, WASHINGTON TERRITORY.

HAY-LOADER.

SPECIFICATION forming part of Letters Patent No. 398,682, dated February 26, 1889.

Application filed May 29, 1888. Serial No. 275,673. (No model.)

*To all whom it may concern:*

Be it known that I, WILLIAM M. WHITE, a citizen of the United States of America, residing at Tacoma, in the county of Pierce and Territory of Washington, have invented certain new and useful Improvements in Hay-Loaders, of which the following is a specification, reference being had therein to the accompanying drawings.

This invention pertains to certain new and useful improvements in hay-loaders, having reference more particularly to the class of lifting-reels.

The object of the invention is to provide simple and highly-efficient means for readily and easily gathering hay and transferring the same into an inclined wagon, from which it can be readily removed or dumped at the desired point in the formation of shocks; and the invention therefore comprises the details of construction, combination, and arrangement of parts, substantially as hereinafter fully set forth, and particularly pointed out in the claims.

In the accompanying drawings, Figure 1 is a view in perspective of my improved hay-loader. Fig. 2 is a side view thereof. Fig. 3 is a plan view. Fig. 4 is an enlarged detail perspective view of a portion of the reel and its adjuncts. Fig. 5 is a detail view of one of the wheel-teeth. Fig. 6 is a side elevation of the reel. Fig. 7 is a detail view of one of the rake-heads. Fig. 8 is a detail perspective view of two of the cams.

Referring to the drawings, A designates the wagon-body, preferably arranged on an incline from front to rear, as shown, and the front portion, $a$, of the bottom of the said body is disposed some distance higher than the rear portion, $a'$, a middle transverse opening, $a^2$, being formed between said front and rear portions. A cross-bar, $a^3$, is secured to the inner end of the front portion, $a$, as shown.

The front portion, $a$, of the wagon-body is raised above the rear portion so as to aid, to a certain degree, in directing the passage or falling of the hay onto said rear portion, and from here the hay can be transferred by a fork, or other means, to the front raised portion after a sufficient quantity thereof has been secured on said rear portion.

To the front end of the wagon-body is secured an ordinary seat, A', for the driver, and to the front of said body is secured a foot-rest, A".

B B' are the rear carrying-wheels, loosely secured upon their axle $b$, to the bolster $b'$ of which are connected the sides of the rear end of the wagon-body, and to the spokes or to the hub of the wheel B' is connected a sheave wheel or pulley, $b^2$.

The front carrying-wheels, C C, are loosely secured upon an axle, $b^3$, to which is attached an ordinary bolster, C', having the usual standards, $C^2$, provided with curved side arms, $C^4$. To these standards $C^2$ and arms $C^4$ is secured a supplementary bolster, $C^3$, rigidly attached to the under side of said front of the wagon-body, and by means thereof the said front end of said body is held elevated.

The carrying-wheel B may be provided with approximately-U-shaped teeth C" to prevent the same from slipping, said teeth being held in position against the tire and fellies by means of nutted bolts $C^5$ passed through the apertured sides thereof. (See Figs. 2, 3, and 5.)

To the axle $b^3$ are connected the forward ends of a hound, D, and to the central kingbolt, $d$, is secured the forward end of a short reach-pole, $d'$, to which are secured the forward ends of divergent brace-bars $d^2$ $d^2$, the rear outer ends of which are connected by suitable means to a cross-piece, $d^3$, of the wagon-body. By means of this construction the strength of the wagon-body is greatly augmented, and the parts are firmly united and held together; but as this forms no part of my invention it is obvious that any other suitable means may be employed for strengthening the wagon-body.

E is a revolving reel located about midway the length of the wagon-body directly under the central opening, $a^2$. This reel has a canvas or other suitable cylindrical casing, $e'$, and from its central hub project eight (more or less) radiating arms, $e^2$, arranged in pairs, as shown, a slot or opening, $e^3$, being formed by each pair of arms, and to the outer ends of these arms said canvas or casing is connected. To retain the casing $e'$ in a cylindrical shape, I preferably employ a central supplementary series of arms, $e^2$, fast upon the reel-shaft at its center, and by rigidly securing the casing to the ends of these arms the same always maintains its shape. The ends of the central shaft, $e^4$, of this reel are supported by approximately-X-shaped brackets $e^5$, attached to the sides of the wagon-body, said ends being secured in the vertexes of said brackets.

F F are rake-heads, composed each of two similar boards united together. These rake-heads have secured between their boards end plates, E′, which are designed to fit and slide within the slots or openings $e^3$ formed by the pairs of arms $e^2$, said end plates being projected through said slots a short distance. Between these boards of the rake-heads are secured the rake teeth or tines $f f$, the lower ends of which have eyes or loops $f'$, through which the bolts $f^2$ are passed for securing the same in position. The outer ends of these rake teeth or tines are slightly bent or curved, as shown, and each tooth of each rake-head is designed to project through a suitable slit or opening, $f^3$, formed in the cylindric covering or casing $e'$ opposite said tooth.

G G′ are two oppositely-disposed cams. The cam G is attached to the inner sides of the X-shaped brackets $e^5$ by any suitable and well-known means, as by staples, bolts, screws, &c. The cam G′ is rigidly secured upon a short rod or stud, K, passed through an aperture in the bracket $e^5$. The cam G is about twice the length of the cam G′, and is so disposed that its lower outer end occupies a position immediately adjacent to the lower pair of arms, $e^2$, of the reel E. With the inner surface of the cam G and the outer surface of the cam G′ are designed to come in contact the projecting end plates, E′, extending from the ends of the rake-heads. By means of this arrangement the rake-teeth are drawn inward or forced outward, according as they are being elevated or lowered by the revolution of the reel. The cam G′ is only extended to within a short distance of the lower pair of arms, $e^2$, because the lowering of the rake-teeth and head is aided by gravity. To the outer end of the short rod or stud K is rigidly connected one end of a lever, $k$, the other end, $k'$, of which is located near the driver's seat, said lever being suitably held in place along the side of the wagon-body.

To provide means for retaining the rake-teeth within the reel and prevent the lowering thereof, I secure to or form integral with the upper end of the cam G′ the upper end of an inner supplemental cam, $G^2$, the lower end of which extends to within a short distance of the cam G. The driver or operator can, by pressing on the end $k'$ of the lever $k$, shift the cams G′ $G^2$, so that the end plate, E′, of the topmost rake-head, instead of passing over the outer surface of said cam G′, will pass over the inner surface of the cam $G^2$. By this means the rakes are held from projecting when it is not desired to gather hay. A second sheave wheel or pulley, H, is secured on the extreme outer end of the shaft $e^4$, and around it and the sheave-wheel $b^2$ is passed an endless chain belt, $h$, fitting in the sheaves or grooves formed in the outer circumference of said wheels. By this means motion is transmitted to the reel.

I is a tilting bottom disposed at the rear end of the wagon-body, and the same is secured by hinges $i\ i$ to the axle-bolster $b'$, so that it can be tilted rearwardly. Beneath the rear end of this tilting bottom is a bar, $i'$, which is passed through and held in place by suitable irons or brackets, $i^2$, attached to the side-boards of the wagon-body, one of said irons or brackets being shown in Fig. 1.

A rock-shaft, J, is journaled at its ends in the sides of the wagon-body adjoining the inner end of the tilting bottom, and the same is provided with two (more or less) curved arms, $j\ j$, extending rearward over the front edge of said bottom, whereby the same is held in place when lowered, the rear end thereof being supported by bar $i'$. One end of this rock-shaft J has a crank-handle, $j'$, to permit of easy manipulation thereof, the outer end, $j^2$, of said handle being weighted so as to hold the said rock-shaft in its normal position with the arms $j\ j$ overlapping the platform I. To tilt the platform, the operator withdraws the bar $i'$ and turns the rock-shaft J, so as to free the arms $j\ j$ from contact with said platform.

From the foregoing description it will be seen that the teeth of each rake will be forced through their respective slits by the cam G′, and will project in practice a suitable distance below the inclosing-casing $e'$, and upon coming in contact with the hay will convey the same upward and through the central opening, $a^2$, onto the rear portion of the wagon-body, said rake-heads being free to move in the slots or openings $e^3$, as is obvious. In the upward movement of the rakes the teeth thereof are being gradually drawn inward by the cam G, and thus when said teeth reach the top of the reel the rake-head will be at the lower inner end of the slots or openings $e^3$.

In practice an attendant by means of a rake moves the hay to the desired point after the same is deposited or thrown onto the wagon-body by the reel, and when sufficient hay has been secured on the platform I, and it is desired to form the same into shocks, the operator turns the rock-shaft J and withdraws supporting-bar $i'$, permitting the dumping of the hay, after which said platform is returned to its proper position.

To throw the operating mechanism out of gear, I form a spline or lug, $k^4$, on the end of the shaft $e^4$, which corresponds with a groove in the hub of the sheave wheel or pulley H. To this sheave wheel or pulley is connected one end of a second lever-rod, $k^2$, the other end, $k^3$, of which is also adjacent the driver's seat. This lever $k^2$, like the lever $k$, is secured by suitable means against the side of the wagon.

The advantages of my invention will be apparent to those skilled in the art to which it appertains, and it will be seen that the same embodies advantages in point of simplicity, durability, general efficiency, and inexpensiveness.

I claim as my invention—

1. The combination, with the wagon-body having the central transverse opening and the brackets, of the reel having its shaft supported by said brackets, the series of radial arms secured to said shaft and arranged in pairs, the casing attached to the outer ends of said arms and having slits formed therein, the rake-heads having curved teeth or tines and end plates, E', and the cams secured to said brackets, substantially as set forth.

2. The combination, with the wagon-body and the brackets secured thereto, of the reel, its shaft, the series of radial arms secured to said shaft, the rake-heads having end plates, E', the stationary cam G, secured to said brackets, the movable cams G' G², connected together at their upper ends, the pivoted stud K, upon which said cam G' is rigidly secured, and the lever for operating said stud and cams, substantially as set forth.

3. As an improvement in hay-loaders, the combination, with the wagon-body, of the rear tilting bottom hinged to the rear axle, and the rock-shaft extended across said wagon-body and provided with curved arms overlapping the forward end of said bottom and having a weighted handle, substantially as set forth.

4. The combination, with the wagon-body, of the rear tilting bottom, the rock-shaft extended across said wagon-body and having curved arms overlapping the front end of said bottom, and the supporting-bar beneath the rear end of said bottom sliding in keepers on the wagon-body, substantially as set forth.

In testimony whereof I affix my signature in presence of two witnesses.

WILLIAM M. WHITE.

Witnesses:
  B. W. COINER,
  H. P. MCLAUGHLIN.